United States Patent
Kuz

[11] Patent Number: 6,036,168
[45] Date of Patent: Mar. 14, 2000

[54] CONTROL VALVE INCLUDING A PISTON CYLINDER CONNECTED TO A SPRING STEEL SEALING MEMBER

[75] Inventor: Zdenko Kuz, Cham, Switzerland

[73] Assignee: Emhart Glass S.A., Cham, Switzerland

[21] Appl. No.: 09/127,559

[22] Filed: Jul. 31, 1998

[30] Foreign Application Priority Data

Aug. 7, 1997 [GB] United Kingdom .................... 9716618

[51] Int. Cl.⁷ .................................................. F16K 31/122

[52] U.S. Cl. .............................................. 251/63.6; 251/63

[58] Field of Search ............................... 251/63.6, 62, 63, 251/63.5, 61.2, 61.4, 319, 320, 321

[56] References Cited

U.S. PATENT DOCUMENTS

| | | |
|---|---|---|
| 4,721,283 | 1/1988 | Wilson . |
| 4,749,000 | 6/1988 | Ringe et al. .................... 251/61.4 X |
| 5,246,205 | 9/1993 | Gillingham et al. .............. 251/61.4 X |
| 5,671,902 | 9/1997 | Gauthiere et al. ..................... 251/63.5 |

FOREIGN PATENT DOCUMENTS 0830097   3/1960   United Kingdom .

*Primary Examiner*—Kevin Lee
*Attorney, Agent, or Firm*—Spencer T. Smith

[57] ABSTRACT

An on-off valve for use in an air line of a cooling system of a glass container manufacturing machine comprises an integral frame defining an opening, a generally planar sealing member adapted to engage the frame, and a piston and cylinder device which moves the sealing member perpendicular to its plane between an open and a closed position.

8 Claims, 2 Drawing Sheets

CONTROL VALVE INCLUDING A PISTON CYLINDER CONNECTED TO A SPRING STEEL SEALING MEMBER

This invention is concerned with control valves used in cooling systems in glass container manufacturing machines.

BACKGROUND TO THE INVENTION

In the well known I.S. (individual section) machine for the manufacture of glass containers, molten glass is formed into containers in moulds, a parison being formed in a blank mould, the parison being transferred to a blow mould and, in the blow mould, blown into the required shape.

It is necessary to cool the moulds to maintain them at the appropriate temperature for these forming operations. While in recent years the cooling of the moulds by the flow of air through axial holes in the moulds has become increasingly popular, extensive use is still made of what is known as 'stack cooling' in which cooling stacks are arranged close to the moulds of the machine and cooling air is supplied to the stacks and is directed through openings in the stack against the mould to cool it. Normally this air is directed against the moulds when the moulds are open. A valve is provided to give on-off control of the air.

Stack cooling is shown for example, in U.S. Pat. No. 3,355,277. As is usual in stack cooling systems this specification shows an on-off valve which is a flap valve. Because of the continuous wear on these valves they need fairly frequent replacement, and because of their construction they are comparatively expensive.

It is one of the objects of the present invention to provide a valve for use in an air line of a cooling system of a glass container manufacturing machine which is both economical and efficient in construction.

BRIEF STATEMENT OF THE INVENTION

The present invention provides a valve for use in the air line of a cooling system of a glass container manufacturing machine comprising an integral frame comprising a peripheral flange adapted to be positioned in the air line, a tubular portion which defines an opening extending through the frame, and a support extending across the opening a generally planar sealing member in the form of a springy plate mounted for movement into and out of a closed position in which the opening in the frame is closed a piston and cylinder device mounted on the support and arranged to move the sealing member into and out of its closed position.

BRIEF DESCRIPTION OF THE DRAWINGS

There now follows a description, to be read with reference to the accompanying drawings, of a valve embodying the invention.

In the drawings.

DESCRIPTION OF THE PREFERRED EMBODIMENT

Figure 1:
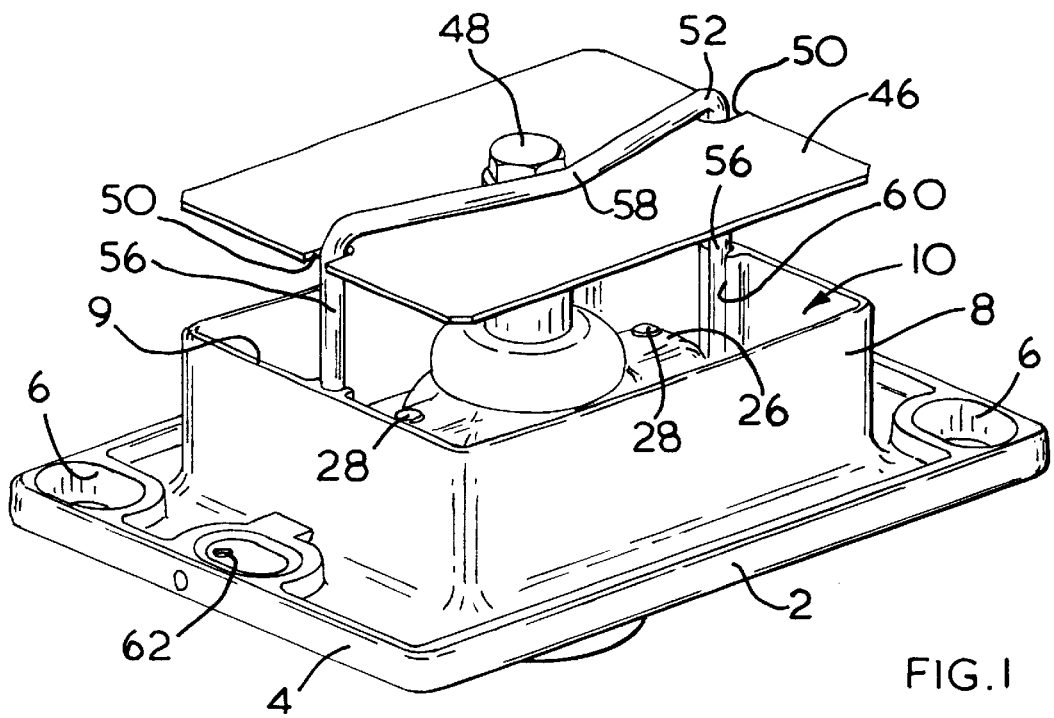
FIG. 1 shows a bottom perspective view of the valve
Figure 2:
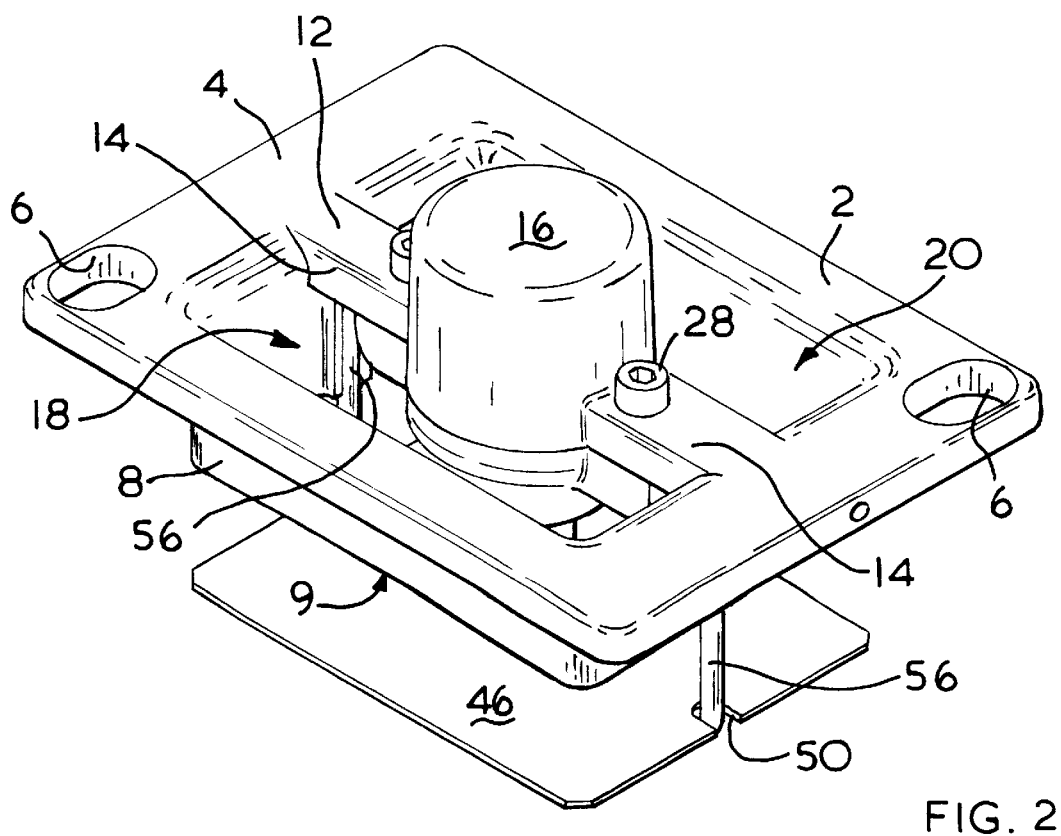
FIG. 2 shows a top perspective view of the valve
Figure 3:
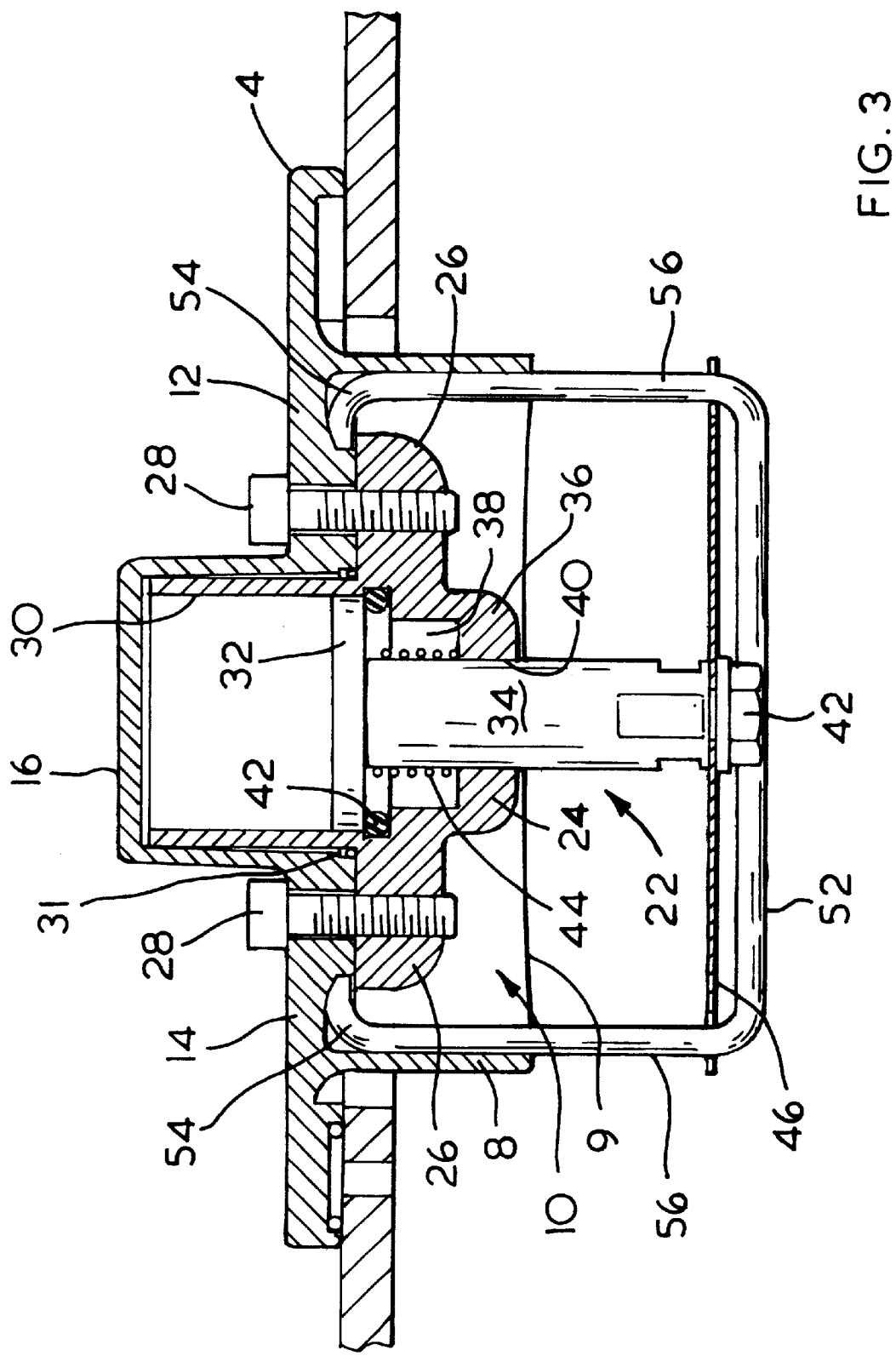
FIG. 3 shows a view of the valve in longitudinal section.

A valve comprises a one piece frame 2 of diecast aluminium comprising a peripheral flange 4 provided with bolt holes 6 adapted to be positioned in an air line and secured in position by bolts through the bolt holes 6. The flange 4 is generally rectangular in outline, and the frame 2 also comprises, extending upwardly (viewing FIG. 1) from the flange 4 a tubular portion 8 which is also generally rectangular in outline and which defines a generally rectangular opening 10 extending through the frame 2. The tubular portion 8 comprises a rectangular peripheral end surface 9: opposed short parallel portions of the face 9 are flat and in the same plane opposed longer parallel portions of the face 9 are slightly bowed upwards, as shown in FIG. 3.

Extending across the opening 10 generally in the same plane as the flange 4 is a support 12. The support 12 comprises two arm portions 14 and a central cup 16, and extends across the wider portion of the opening 10, opening portions 18,20 extending on either side of the support 12.

A pneumatically operated piston and cylinder device 22 is mounted on the support 12. The piston and cylinder device 22 comprises a cylinder member 24 comprising radial lugs 26 which are secured to the arm portions 14 by bolts 28.

The cylinder member 24 is of cast iron and comprises a cylindrical portion 30 which is fitted into the cup 16, a circular seal 31 sealing between the outside of the cylindrical portion 30 and the cup 16. A piston head 32 attached to a piston rod 34 is mounted for movement in the cylindrical portion 30. The cylinder member 24 also comprises a lower portion 36 which has a cylindrical portion 38 of lesser diameter than the portion 30, and a bore 40 through which the piston rod 34 extends. An O-ring 42 is provided in a circumferential groove at the junction of the cylindrical portions 30 and 38, and a compression spring 44 acts between the piston head 32 and an upper end of the portion 38. The O-ring 42 not only serves as a seal but also provides end stop damping on movement of the piston head 32 and rod 34 into the position shown in FIG. 3.

The valve also comprises a sealing member 46 which is mounted for movement in and out of a closed position in which the opening 10 in the frame 2 is closed. The sealing member 46 is in the form of a generally planar springy plate, e.g. of spring steel, and is secured by a single central bolt 48 to the piston rod 34. The member 46 comprises diametrically opposed cut out portions 50. A guide member 52 is in the form of a steel rod which is bent to provide inwardly extending feet 54, side portions 56, and a cranked central portion 58. The guide member 52 is located in the frame 2, the side portions 56 being located in grooves 60 in the tubular portion 8, the feet 54 clipping between the radial lugs 26 and the arm portions 14, and the cranked central portion 58 extending across the member 46, avoiding fouling the bolt 48. The side portions 56 of the guide member 52 lie in the cut out portions 50 of the member 46.

An air inlet 62 is provided on the flange 4 and an air passage (not shown) leads from the inlet 62 through one of the arm portions 14 of the support 12 to the piston and cylinder device 22. Air supplied through the inlet 62 causes the device 22 to move the sealing member 46 downwards to its open position, as shown in FIG. 3: when the air is cut off and the inlet 62 vented to exhaust the spring 44 asserts itself to move the sealing member 46 upwards into sealing engagement with the end face 9 of tubular portion 8 to close the valve. Because the sealing member 46 is of spring steel and generally planar in shape, closing impact of the member 42 with the tubular portion 8 is effectively smooth, and the member 42 naturally forms an effective seal around the piston 8, flexing to seal against the end face 9.

I claim:

1. A valve for use in the air line of a cooling system of a glass container manufacturing machine comprising
an integral frame including
a tubular portion which defines a passage extending through the frame,
said passage having an opening defined by a peripheral rectangular flange,
a support extending across the passage,
a generally planar rectangular spring steel sealing member mounted for movement into and out of a closed position engaging said peripheral rectangular flange, and
a piston and cylinder device mounted on the support, said piston connected to said generally planar rectangular spring steel sealing member proximate the center thereof to move the sealing member into and out of its closed position, and
wherein said peripheral rectangular flange includes a first opposed pair of flat surfaces and a second opposed pair of upwardly bowed surfaces.

2. A valve according to claim 1 in which said piston and cylinder device is pneumatically operated, air being provided to said device through an air passage in said frame.

3. A valve according to claim 1 wherein said support comprises a central cup in which said piston and cylinder device is positioned.

4. A valve according to claim 3 wherein a cylinder member is secured to said frame and comprises a cylindrical member which fits into the cup.

5. A valve according to claim 4 wherein said frame is of aluminium and the cylinder member of cast iron.

6. A valve according to claim 1 wherein said piston and cylinder device comprises a spring which urges the sealing member into its closed position.

7. A valve according to claim 1 wherein said sealing member is attached to the piston of the piston and cylinder device by a single bolt.

8. A valve according to claim 7 wherein said sealing member is generally rectangular, the valve comprising a guide member in the form of a rod bent to provide two guide portions generally perpendicular to said sealing member and engaging in opposed cutout portions in the sealing member.

* * * * *